United States Patent [19]

Hashimoto et al.

[11] Patent Number: 5,263,450
[45] Date of Patent: Nov. 23, 1993

[54] CONTROL APPARATUS FOR A MULTI-CYLINDER INTERNAL COMBUSTION ENGINE

[75] Inventors: Atsuko Hashimoto; Toshio Iwata, both of Himeji, Japan

[73] Assignee: Mitsubishi Denki Kabushiki Kaisha, Tokyo, Japan

[21] Appl. No.: 904,582

[22] Filed: Jun. 26, 1992

[30] Foreign Application Priority Data

Jun. 27, 1991 [JP] Japan ................................. 3-156723
Jun. 27, 1991 [JP] Japan ................................. 3-156724
Jul. 4, 1991 [JP] Japan ................................. 3-164490
Jul. 4, 1991 [JP] Japan ................................. 3-164491

[51] Int. Cl.$^5$ ........................ F02D 41/30; F02P 7/077
[52] U.S. Cl. .................................. 123/414; 123/487; 123/612
[58] Field of Search ............... 123/414, 476, 477, 487, 123/612, 613, 617

[56] References Cited

U.S. PATENT DOCUMENTS 4,309,973 1/1982 Tamura ............................. 123/609
4,457,286 7/1984 Katayama et al. ................. 123/612
5,060,614 10/1991 Uchimi et al. ..................... 123/414

Primary Examiner—Andrew M. Dolinar
Attorney, Agent, or Firm—Sughrue, Mion, Zinn, Macpeak and Seas

[57] ABSTRACT

A control apparatus can electronically control the operation of a multi-cylinder engine in a precise manner. A first signal generator 1 and a second signal generator 2 are provided on a camshaft operatively connected with a crankshaft for generating a cylinder identifying signal SC and a reference position signal ST, respectively, in synchronism with the rotation of the camshaft. A pulse signal generator 6 or 12 is provided on a crankshaft for generating a pulse signal P of a high frequency in synchronism with the rotation of the crankshaft. The reference position signal ST contains a series of pulses each indicative of a first and a second reference position for each cylinder which are modified by counting the number of pulses in the pulse signal P to provide exact reference positions. A microcomputer 5 or 15 controls the engine based on the exact reference positions of each cylinder thus obtained. In a modified form, instead of two signal generators 1, 2, a single signal generator 11 is employed which is provided on the camshaft for generating a single signal SCT which contains a series of pulses having different pulse widths corresponding to different cylinders. The signal SCT and the pulse signal P are input via an AND gate 17 to a counter 16 where the number of pulses in the pulse signal P during the pulse width of each pulse of the SCT signal is counted for cylinder identification.

11 Claims, 13 Drawing Sheets

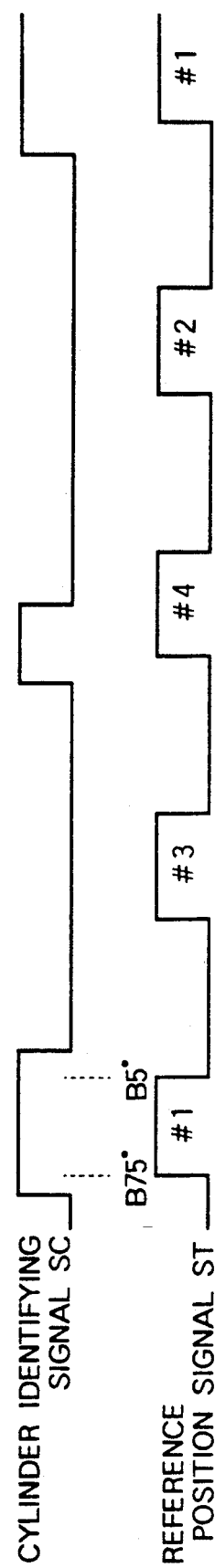

CONTROL APPARATUS FOR A MULTI-CYLINDER INTERNAL COMBUSTION ENGINE

BACKGROUND OF THE INVENTION

The present invention relates to a control apparatus for a multi-cylinder internal combustion engine which controls engine operation such as ignition timing, fuel injection timing and the like based on a reference position signal generated in synchronism with the rotation of a crankshaft of the engine. More particularly, it relates to an engine control apparatus in which reference crank positions for each cylinder can be determined in a precise manner.

In general, in a multi-cylinder internal combustion engine having a crankshaft driven by a plurality of cylinders and a camshaft operatively connected with the crankshaft, a plurality of reference position signals, which are generated by a reference signal generator in synchronism with the rotation of the crankshaft, are used for controlling engine operation such as ignition timing, fuel injection timing for each cylinder. Each of the reference position signals corresponds to a predetermined rotational angle of the crankshaft, which is hereinafter referred to as a predetermined crank angle or position. The reference signal generator is generally mounted on the crankshaft or the camshaft which is operatively connected with the crankshaft in synchronized rotation therewith.

FIG. 12 illustrates a typical example of a conventional engine control apparatus for a multi-cylinder internal combustion engine. The apparatus illustrated includes a first or cylinder identifying signal generator 1 mounted on an unillustrated camshaft, which is operatively connected to an unillustrated crankshaft of the engine for synchronized rotation therewith, for generating a cylinder identifying signal SC, and a second or reference signal generator 2 mounted on the camshaft for generating a reference position signal ST indicative of two predetermined reference positions corresponding to two predetermined crank angles. The cylinder identifying signal SC from the first signal generator 1 and the reference signal ST from the second signal generator 2 are supplied through a first and a second interface 3, 4, respectively, to a control unit in the form of a microcomputer 5 which controls the ignition timing for each cylinder based on these signals.

Generally, the camshaft, on which the cylinder identifying signal generator 1 and the reference signal generator 2 are mounted, is operatively connected with the crankshaft such that it performs one complete revolution per two revolutions of the crankshaft.

As shown in FIG. 13, the cylinder identifying signal generator 1 generate a cylinder identifying signal SC including an appropriate number of pulses each corresponding to a specific cylinder per one camshaft revolution, and the reference signal generator 2 generates a reference position signal ST including a plurality of reference pulses each corresponding to predetermined reference crank positions of a corresponding cylinder. For example, these signal generators 1, 2 may be constructed as follows. A rotating disk is mounted on the camshaft for integral rotation therewith and has a plurality of first and second arcuate slits formed therethrough. The first slits correspond in number to the cylinders and are disposed around the center of rotation of the disk at equal circumferential intervals. Each of the first slits has a leading edge and a trailing edge corresponding to two predetermined reference crank positions or angles for a corresponding cylinder. Each of the second slits corresponds to a specific cylinder. The first and second slits during the rotation of the disk are sensed by an appropriate sensing means such as a photocoupler which generates a cylinder identifying signal each time it senses one of the second slits, and a reference position signal each time it senses one of the first slits.

FIG. 13 illustrates a waveform diagram showing the waveforms of an example of the cylinder identifying signal SC and an example of the reference position signal ST, which are adapted for use with an engine having four cylinders #1 through #4. Here, the cylinder identifying signal SC includes two kinds of rectangular-shaped pulses generated for two specific cylinders, cylinder #1 and cylinder #4. The reference position signal ST includes a series of rectangular-shaped pulses each having a leading or rising edge corresponding to a second reference position of a corresponding cylinder, e.g., 75 degrees (B75°) before top dead center (BTDC), and a trailing or falling edge corresponding to a first reference position thereof, e.g., 5 degrees (B5°) BTDC.

The operation of the above-mentioned conventional engine control apparatus will now be described below while referring to the waveform diagram of FIG. 13. As the engine starts to operate, the first and second signal generators 1, 2 generate a cylinder identifying signal SC and a reference position signal ST which are fed to the microcomputer 5. Based on these signals SC and ST, the microcomputer 5 senses the first reference position B5° and the second reference position B75° of each cylinder and controls the optimum ignition timing and the optimum fuel injection timing for each cylinder in a timer-controlled manner on the basis of the first and second reference positions thus sensed while reflecting the running conditions of the engine such as the rotational number (rpm), the engine load, etc.

Specifically, during the low-speed or low-load operation of the engine, the ignition timing is electronically controlled in an ignition-retarding direction, whereas during the high-speed or high-load operation, the ignition timing is electronically controlled in an ignition advancing direction. The actual ignition timing is controlled through a timer with a length of time measured from the first or second reference position B5° or B75°.

On the other hand, in a unstable operating range of the engine such as an early or initial stage of engine starting operation, the microcomputer 5 controls the ignition such that the power supply to an ignition coil of the engine is started at the second reference position B75° and it is cut off at the first reference position B5°. Such ignition control serves to not only ensure a relatively long power supply or conduction time enough to provide large discharge energy for firing a cylinder but also cause combustion of an air/fuel mixture therein at proper timing suitable for generating not less than a predetermined amount of torque required for the operating range of the engine, thereby ensuring a minimum engine operation.

In this case, however, since the camshaft is operatively connected with the crankshaft through a power transmission belt such as a timing belt, it is extremely difficult to always ensure that the camshaft rotates in exact synchronization with the rotation of the crankshaft. As a result, the reference position signal ST may involve a certain degree of error and thus does not exactly reflect or indicate the predetermined crank positions.

To avoid this problem, it has been proposed that the reference signal generator 2 be mounted on the crankshaft, but in this case, there are structural restrictions such as spatial problems for installation. Moreover, since the crankshaft performs two complete revolutions per one cycle of each cylinder, a single pulse of the reference position signal simultaneously corresponds two or more cylinders, thus making it difficult to perform identification of these cylinders. To this end, an additional cylinder identifying means is required.

In summary, with the conventional engine control apparatus as described above, the first and second reference positions B5°, B75°, which are detected or determined based solely on the reference position signal ST from the reference signal generator 2 mounted on the camshaft, involve more or less errors, so it is impossible to perform highly precise control on the engine using the first and second reference positions.

SUMMARY OF THE INVENTION

Accordingly, the present invention is intended to overcome the above-described problems of the conventional engine control apparatus.

An object of the invention is to provide a novel and improved engine control apparatus which is able to detect or determine reference crank positions of each cylinder with improved accuracy, thereby making it possible to control engine operation based on the thus determined reference crank positions in a precise manner.

Another object of the invention is to provide a novel and improved engine control apparatus which is able to more precisely control engine operation based on reference position signals which are generated by a reference signal generator mounted on a camshaft and which are modified based on a crank angle signal from a pulse signal generator mounted on a crankshaft while reflecting a deviation between each modified reference position and a corresponding actual or true reference position.

A further object of the invention is to provide a novel and improved engine control apparatus which is able to precisely control engine operation based on a cylinder identifying signal and a reference position signal which are generated by a single signal generator, thus reducing the manufacturing costs.

According to one aspect of the invention, there is provided a control apparatus for controlling a multi-cylinder internal combustion engine having a crankshaft and a camshaft which is operatively connected with the crankshaft for synchronized rotation therewith, the control apparatus comprising:

a first signal generator provided on the camshaft for generating a cylinder identifying signal;

a second signal generator provided on the camshaft for generating a reference position signal indicative of a first reference position and a second reference position for each cylinder, the first and second reference positions corresponding to predetermined rotational positions of the crankshaft, respectively;

a third signal generator provide on the crankshaft for generating a pulse signal comprising a series of pulses in synchronization with the rotation of the crankshaft, the pulse signal having a predetermined pitch between successive pulses which corresponds to a predetermined crank angle;

a counter connected to receive the pulse signal from the third signal generator for counting pulses in the pulse signal starting from an initial reference position and generating a modified reference position signal indicative of a modified first reference position and a modified second reference position;

a control unit for controlling the engine based on the output signals from the signal generators and the counter; and a switch connected to receive the output signals from the first and second signal generators for selectively outputting the output signal from the second signal generator to the counter and the control unit, the switch being switched over by the control unit such that it disables the counter and supplies the reference position signal from the second signal generator to the control unit in an unstable operating range of the engine, whereas it enables the counter to supply the modified reference position signal to the control unit in a stable operating range of the engine.

The control unit sets the initial reference position based on the reference position signal from the second signal generator and the pulse signal from the third signal generator in the stable operating range of the engine, modifies the first and second reference positions for each cylinder based on the initial reference position and the pulse signal from the third signal generator to provide the modified first reference position and the modified second reference position for each cylinder, and controls the engine based on the modified first and second reference positions for each cylinder.

The control unit alternately presets the counter to a first predetermined resetting value for the modified first reference position and to a second predetermined resetting value for the modified second reference position.

The control unit sets a new initial reference position from which the counter starts counting, and the control means further includes memory means for storing the initial reference position previously set by the control unit, and updating means for updating the previously set initial reference position stored in the memory means to the new initial reference position if a difference therebetween is greater than a predetermined value.

According to another aspect of the invention, there is provided a control apparatus for controlling a multi-cylinder internal combustion engine having a crankshaft and a camshaft which is operatively connected with the crankshaft for synchronized rotation therewith, the control apparatus comprising:

a first signal generator provided on the camshaft for generating a signal which contains cylinder identifying information and a first reference position for each cylinder;

a second signal generator provided on the crankshaft for generating a pulse signal comprising a series of pulses, the pulse signal having a predetermined pitch between successive pulses which corresponds to a predetermined crank angle;

a first counter connected to receive the pulse signal from the second signal generator for counting the pulse signal starting from a modified reference position corresponding to the first reference position and generating a modified reference position signal;

cylinder identifying means connected to receive the output signals from the first and second signal generators for reading out the cylinder identifying information contained in the output signal from the first signal generator and generating a corresponding signal;

a control unit for controlling the engine based on the output signals from the signal generators, the cylinder identifying means and the counter; and a switch connected to receive the output signal from the first signal generator for selectively outputting it to the counter and the control unit, the switch being switched over by the control unit such that it disables the counter and supplies the output signal from the first signal generator to the control unit in an unstable operating range of the engine, whereas it enables the counter to supply the modified reference position signal to the control unit in a stable operating range of the engine.

Preferably, the first signal generator generates a pulse signal containing a plurality of pulses which correspond in number to the cylinders and which have different pulse widths.

The cylinder identifying means comprises: and AND gate having a first input terminal connected to the first signal generator, a second input terminal connected to the second signal generator, and an output terminal for generating an output signal when the input terminals are at high levels; and a second counter having a clock terminal connected to the output terminal of the AND gate for counting the output signal from the AND gate and generating a corresponding signal to the control unit.

The above and other objects, features and advantages of the invention will be more readily apparent from the following detailed description of preferred embodiments of the invention taken in conjunction with the accompanying drawings.

BRIEF DESCRIPTION OF THE INVENTION

FIG. 13 is a waveform diagram showing the waveforms of cylinder identifying signal SC and a reference position signal ST used in the conventional apparatus of FIG. 12.

In the drawings, the same symbols identify the same or corresponding parts.

DESCRIPTION OF THE PREFERRED EMBODIMENTS

Preferred embodiments of the present invention will now be described in detail while referring to the accompanying drawings.

Figure 1:
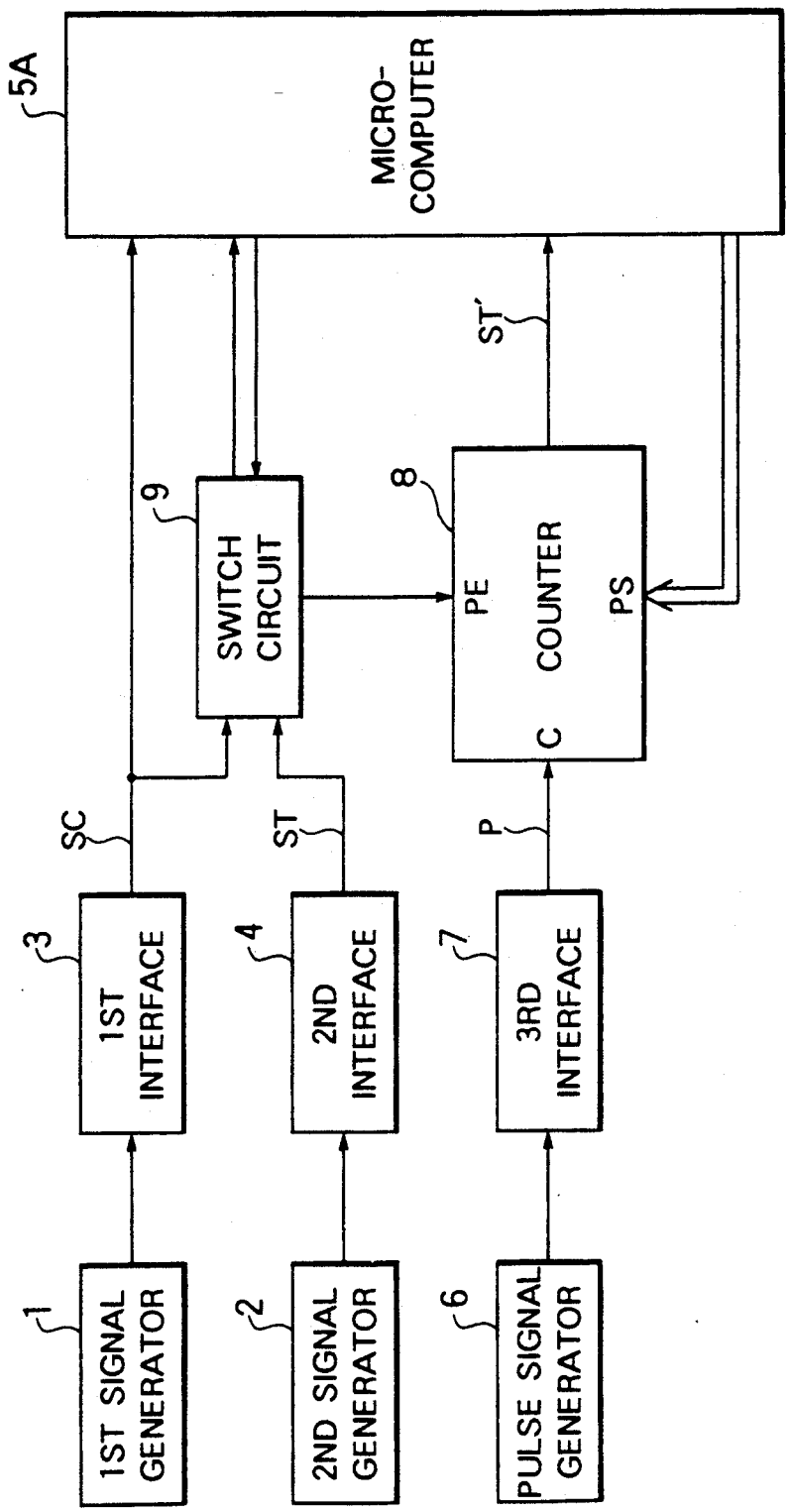
FIG. 1 is a block diagram showing the general arrangement of an engine control apparatus in accordance with a first embodiment of the invention.

Referring to the drawings and first to FIG. 1, therein is illustrated in block form an engine control apparatus constructed in accordance with a first embodiment of the invention. The apparatus illustrated includes a first or cylinder identifying signal generator 1, a second or reference signal generator 2, a first and a second interface 3, 4, and a control unit in the form of a microcomputer 5A, all of which are substantially the same as the elements 1 through 5 of the conventional apparatus of FIG. 12, except for the function of the microcomputer 5A. In addition to these elements, the apparatus of the invention further includes the following elements. Namely, a pulse signal generator 6 is mounted on an unillustrated crankshaft of an internal combustion engine for generating a pulse signal P containing a continuous series of high frequency pulses which have a predetermined pitch or interval of a prescribed crank angle (e.g., 3° in the illustrated embodiment). Such a pulse signal generator 6 is well known in the art and it may comprise an electromagnetic pickup which is disposed near a ring gear, which is mounted on the crankshaft for integral rotation therewith and has a plurality of gear teeth formed around the circumferential surface thereof at equal circumferential intervals, in a manner such that each time it faces one of the gear teeth of the ring gear during the rotation of the crankshaft, it generates an output pulse. A counter 8 has a clock terminal C connected to receive the output pulse signal P from the pulse signal generator 6 via a third interface 7, an enable input terminal PE connected to an output terminal of a switch circuit 9, a preset input terminal PS connected to receive predetermined resetting values from the microcomputer 5A, and an output terminal connected to the microcomputer 5A. After a predetermined resetting value is input from the microcomputer 5A to the preset input terminal PS of the counter 6, the counter 6 generates an inverted signal in the form of a modified reference position signal ST' at its output terminal when its count reaches the predetermined resetting value. The switch circuit 9 has a pair of first and second input terminals connected to the first and second signal generators 1, 2 through the first and second interfaces 3, 4, respectively, a first output terminal connected to the microcomputer 5A and a second output terminal connected to the enable input terminal PE of the counter 8, a third input terminal connected to the microcomputer 5A. The switch circuit 9 is controlled by the microcomputer 5A such that it supplies the reference position signal ST from the reference position signal generator 2 to the microcomputer 5A during the unstable or nonsteady state operation of the engine such as a start-up period, whereas it generates, based on the cylinder identifying signal SC and the reference position signal ST, a reference position detecting signal D corresponding to the first reference position B5° of a specific cylinder to the enable input terminal PE of the counter 8 during the stable or steady state operation of the engine such as the idling operation, normal running operation, etc. In FIG. 1, the switch circuit 9 is illustrated outside the microcomputer 5A, but the function thereof can be incorporated in and performed by the microcomputer 5A, as necessary.

Figure 2:
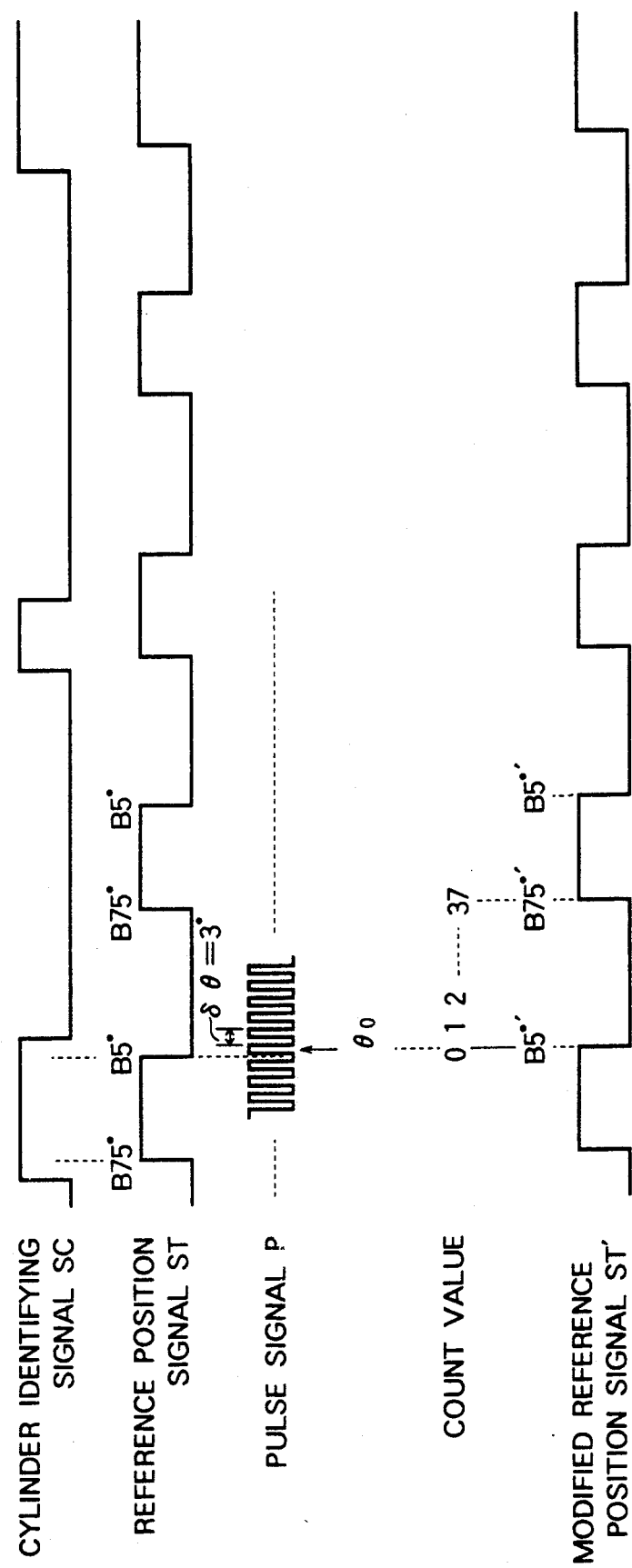
FIG. 2 is a waveform diagram showing the waveforms of various signals used in the present invention.

FIG. 2 shows the waveforms of the cylinder identifying signal SC, the reference position signal ST, the pulse signal P and the modified reference position signal ST'. In the illustrated example, the specifications of the apparatus are as follows: the number of the gear teeth of the ring gear is 120; the pitch $\delta\theta$ between successive pulses of the pulse signal P is 3°; a preset count or resetting value output from the microcomputer 5A to the present input terminal PS of the counter 8 for a crank angle range from a modified first reference position B5°' of a specific cylinder to a modified second reference position B75°' of the following cylinder in the modified reference position signal ST' (i.e., corresponding to a crank angle range of 110°) is 37; and a preset count or resetting value for a crank angle range from the modified second reference position B75°' of the following cylinder to a modified first reference position B5°' of the following cylinder (i.e., corresponding to a crank angle range of 70°) is 23.

The modified reference position signal ST' is generated by the counter 8 based on the number of pulses of the pulse signal P counted from an initial reference position $\theta_0$. The initial reference position $\theta_0$ is a falling edge of the first pulse of the pulse signal P immediately after the detection of the first reference position B5° of a specific cylinder pulse (e.g., for cylinder #1) in the cylinder identifying signal SC in the stable operating range, that is, immediately after a reference position detecting signal D from the switch circuit 9 is input to the enable input terminal PE of the counter 8.

The microcomputer 5A includes a memory means for storing an initial reference position $\theta_0$ as well as a deviation or error $\delta\theta_0$ between the first reference position B5° and a modified reference position $\theta_0$, a modifying means for reflecting the deviation $\delta\theta_0$ on the engine control such as ignition control, fuel injection control or the like, and an updating means for updating or replacing the previously set initial reference position $\theta_0$ stored in the memory means with a newly set reference position $\theta_0'$ when a difference therebetween exceeds a predetermined value.

The microcomputer 5A serves to switch over the switch circuit 9 in dependence upon the operating range (i.e., stable or unstable operation) of the engine. Thus, it controls the engine operation such as the ignition timing, the fuel injection timing, etc., for each cylinder on the basis of the cylinder identifying signal SC and the reference position signal ST in the unstable or nonsteady state operation, whereas in the stable or steady state operation, it control the engine operation on the basis of the cylinder identifying signal SC and the modified reference position signal ST'.

The operation of the above-described embodiment of FIG. 1 will be described below with reference to FIG. 2.

First, in the unstable operating range of the engine such as a start-up period, the rotational speed of the engine greatly fluctuates, so the pulse signal P generated by the pulse signal generator 6 does not exactly correspond to the rotational position or crank angle of the crankshaft. In this state, the switch circuit 9 is controlled by the microcomputer 5A to supply the reference position signal ST from the reference signal generator 2 to the microcomputer 5A while generating no reference position detecting signal D. Accordingly, the microcomputer 5A performs ignition control based on the cylinder identifying signal SC and the reference position signal ST as in the conventional apparatus of FIG. 12.

On the other hand, the engine enters an idling operation in which there are little fluctuations in the engine rotational speed, the pulse signal P generated by the pulse signal generator 6 becomes stabilized, so the switch circuit 9 is switched over by the microcomputer 5A such that it can generate a reference position detecting signal D to the enable input terminal PE of the counter 8 upon detection of the first reference position B5° of a specific cylinder pulse in the reference position signal ST. Simultaneous with this, the microcomputer 1 supplies a predetermined resetting value (e.g., "1" in this embodiment) to the present input terminal PS of the counter 8 to thereby preset the counter 8 to the predetermined value. In this state, the counter 8 waits for an input of a reference position detecting signal D from the switch circuit 9.

Each time the switch circuit 9 detects the first reference position B5° for a specific cylinder based on the cylinder identifying signal SC and the reference position signal ST, it generates a reference signal detecting signal D which is input to the enable input terminal PE of the counter 8. Upon input of the reference signal detecting signal D, the counter 8 starts to count the number of pulses in the pulse signal P which is input from the pulse signal generator 6 to the clock input terminal C of the counter 8 through the interface 7. In this regard, since the counter 8 is initially preset to "1", it is reset to make the modified reference position signal ST' fall upon the first fall (i.e., the initial reference position $\theta_0$) of the pulse signal P, as illustrated in FIG. 2.

Simultaneous with the fall of the modified reference position signal ST', the microcomputer 5A resets the counter 8 and supplies to the preset input terminal PS of the counter 8 a new resetting value (e.g., "37") which corresponds to the second reference position B75° of the following cylinder. Accordingly, when the value of the counter 8 counted from the first fall (i.e., a modified first reference position B5°') of the modified reference position signal ST' reaches "37", the counter 8 makes the modified reference position signal ST' rise, thus providing a modified second reference position B75°'.

Simultaneous with this, the microcomputer 5A resets the counter 8 and supplies to the preset input terminal PS of the counter 8 a value of "23" corresponding to the first reference position B5° of the following cylinder, whereby when the counter 8 counts 32 pulses in the pulse signal P starting from the modified second reference position B75°', it makes the modified reference position signal ST' fall, thus providing a modified second reference position B5°' of the following cylinder. In this manner, the modified reference position signal ST' from the counter 8 is inverted in an alternate manner upon each occurrence of the first and second reference positions B5°, B75, and this process continues even after the engine enters the normal operating range.

The modified reference position signal ST' is measured from the initial reference position $\theta_0$ and hence completely synchronized with the rotation of the crankshaft, so there is no deviation or error involved in the detection of the first and second reference positions B5°, B75° if noise which may be contained therein is ignored.

On the basis of the fact that the pulse signal P after the initial reference position $\theta_0$ falls each time the crankshaft rotates at an angle of 3°, the microcomputer 5A successively stores the counted number of the counter 8 in the memory means incorporated therein, and it alternately output predetermined resetting values (e.g., "23" for the modified first reference position B5°' and "37" for the modified second reference position B75°') to the preset input terminal PS of the counter 8. Thus, based on the modified first and second reference positions B5°', B75°', the microcomputer 5A performs engine control such as ignition control, fuel injection control and the like for each cylinder.

In this manner, the microcomputer 5A determines the modified first and second reference positions B5°', B75°', which are obtained by counting the number of pulses P from the pulse signal generator 6 starting from the initial reference position $\theta_0$, on the basis of the cylinder identifying signal SC and the reference position signal ST from the first and second signal generators 1, 2 as well as the pulse signal P from the pulse signal generator 6. Accordingly, it is possible to control the ignition timing in a highly accurate manner based on the modified first and second reference positions thus determined.

In this embodiment, however, as can be seen from FIG. 2, the modified second reference position B75°' determined by the predetermined resetting value of "37" corresponds to an actual or true crank angle of B74°, so the microcomputer 5A performs engine control such as ignition timing control more precisely than with the conventional apparatus in which engine control is made on the basis of the non-modified reference crank position.

Also, although in the case of the number of the teeth of the ring gear being 120 for example, there is no error or deviation between the modified first reference position B5°' determined on the basis of the resetting value 23, the teeth number of the ring gear can be an arbitrary value such as an odd number, in which case there may be more or less errors between the modified first and second reference positions and the actual or true first and second reference positions. As a result, the microcomputer 5A includes the modifying means for calculating a reference position error or deviation depending upon the number of the gear teeth and modifying the predetermined ignition timing or fuel injection timing for each cylinder while reflecting the results of such calculations.

Figure 3:
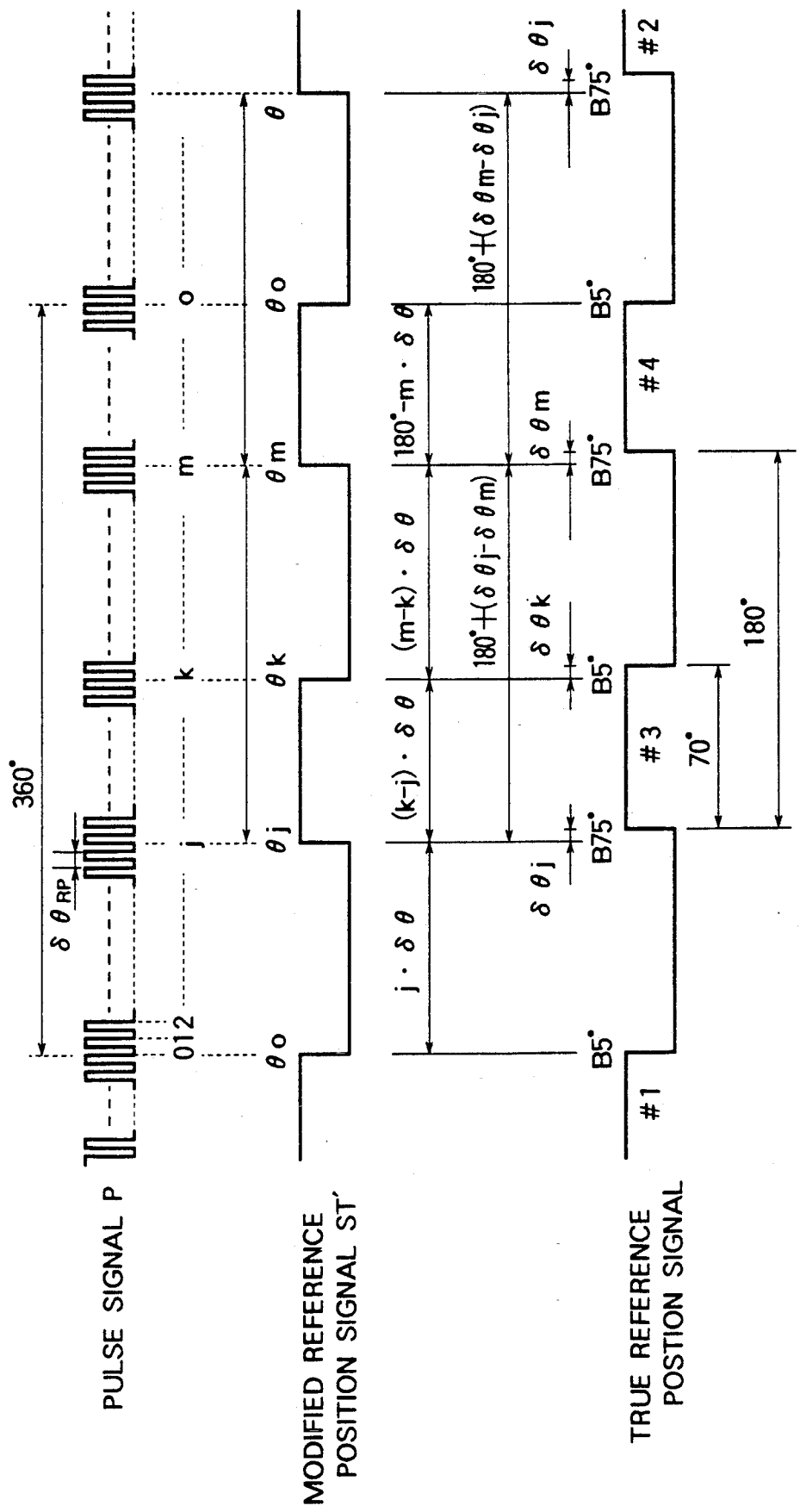
FIG. 3 is a waveform diagram showing differences or deviations of respective reference crank positions of a modified reference position signal from corresponding ideal or true reference positions.

In the following, such ignition timing modifications will be described while referring to the waveform diagrams of FIGS. 3 and 4. FIG. 3 shows errors involved in the modified reference position signal ST' with reference to an ideal or true reference position signal in which j, k and m represent the respective numbers of pulses in the pulse signal P counted from the initial reference position $\theta_0$; $\theta_j$ and $\theta_m$ represent second reference positions B75° for one cylinder and the following cylinder, respectively; $\theta_k$ is the first reference position B5° for the one cylinder; and T(n) and T(n+1) ignition periods between successive second reference positions. In the illustrated example, let us assume that the first reference position $\theta_k$ for cylinder #1 correspond to the first crank angle of B5°.

Moreover, in FIG. 3, $\delta\theta_j$ represents an error or deviation between $\theta_j$ and B75°; $\delta\theta_k$ represents an error or deviation between $\theta_k$ and B5°; and $\delta\theta_m$ is an error or deviation between $\theta_m$ and B75°. $\delta\theta_j$, $\delta\theta_k$ and $\delta\theta_m$ can be calculated from the number of teeth of the ring gear.

As shown in FIG. 3, the angular distances or crank angles $\theta_{0j}$, $\theta_{jk}$ and $\theta_{km}$ between the respective crank positions $\theta_0$, $\theta_j$ and $\theta_m$ of the modified reference position signal ST' are expressed as follows:

$$\theta_{0j} = j \times \delta\theta$$

$$\theta_{jk} = (k-j) \times \delta\theta$$

$$\theta_{jm} = (m-k) \times \delta\theta$$

where $\delta\theta$ is an angular distance between successive pulses in the pulse signal P.

Also, the angular distances or crank angles $\theta_{jm}$ and $\theta_{mj}$ corresponding to successive ignition periods T(n−1) and T(n) are expressed as follows:

$$T(n-1) = 180° + (\delta\theta_j - \delta\theta_m)$$

$$T(n) = 180° + (\delta\theta_m - \delta\theta_j)$$

Figure 4:
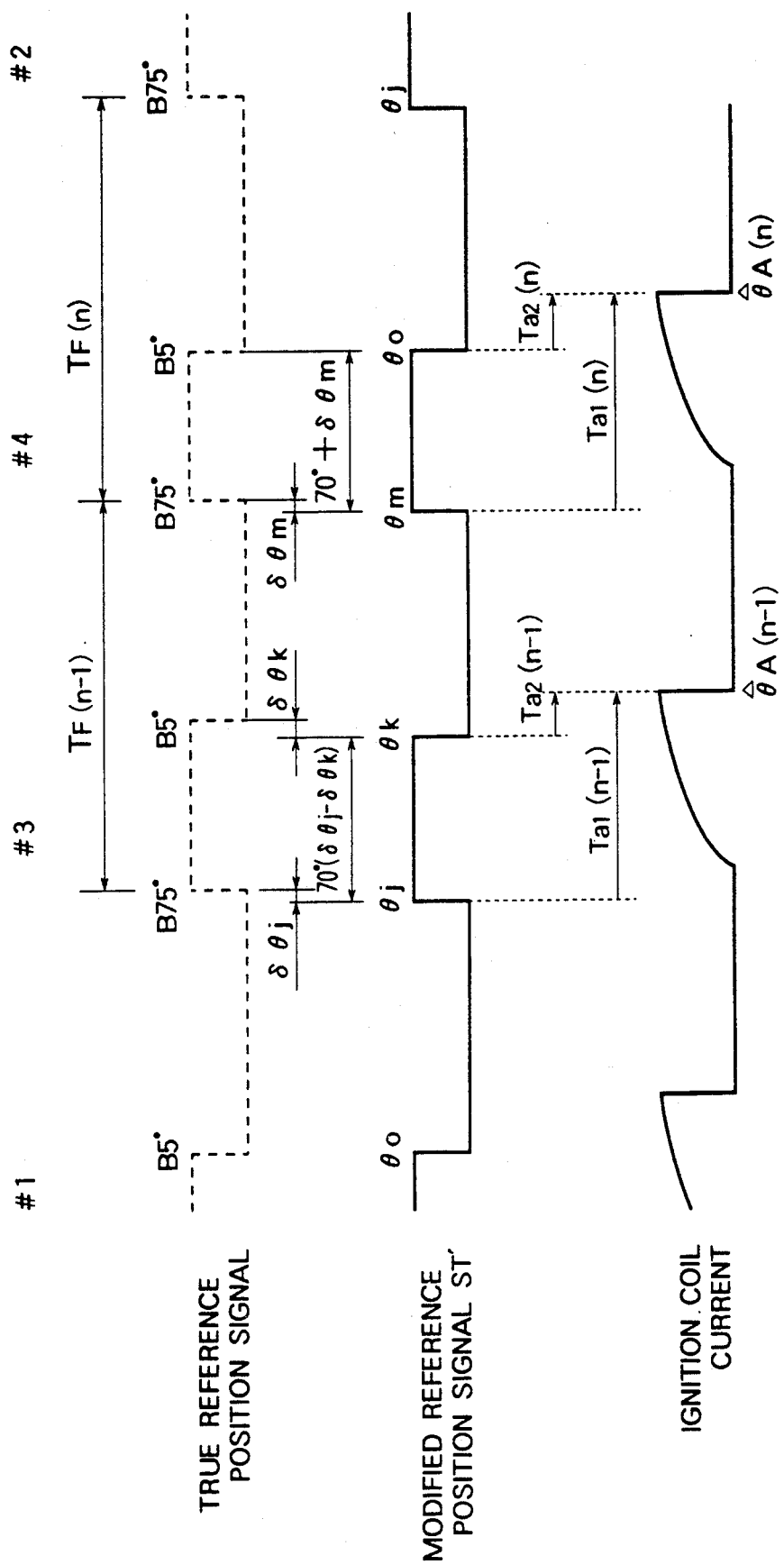
FIG. 4 is a waveform diagram explaining one example of a deviation correcting or modifying operation according to the invention.

FIG. 4 shows how to calculate the ignition timing for each cylinder based upon the deviations $\delta\theta_j$, $\delta\theta_k$ and $\delta\theta_m$ as well as the modified reference positions $\theta_j$, $\theta_k$ and $\theta_m$. In FIG. 4, TF(n−1) and TF(n) represent an estimated previous ignition period and an estimated current ignition period, respectively, which are calculated from previously measured ignition periods; $\theta_A(n-1)$ and $\theta_A(n)$ represent target power cut-off positions (i.e., target ignition timings) for cylinders #3 and #4, respectively, for cutting off the power supply to an unillustrated ignition coil; Ta$_1$(n−1) and Ta$_2$(n−1) represent control times from the modified reference positions $\theta_j$ and $\theta_k$ up to the previous target ignition timing $\theta A(n-1)$, respectively; and Ta$_1$(n) and Ta$_2$(n) represent control times from the modified reference positions $\theta_m$ and $\theta_0$ up to the target ignition timing $\theta A(n)$.

The angular distance or crank angle $(k-j)\delta\theta$ between the modified reference positions $\theta_j$ and $\theta_k$ is represented as follows:

$$(k-j)\delta\theta = 70° + (\delta\theta_j - \delta\theta_k)$$

The angular distance or crank angle $(180° - m \times \delta\theta)$ between the modified reference positions $\theta_m$ and $\theta_0$ is represented as follows:

$$(180° - m \times \delta\theta) = 70° + \delta\theta_m$$

In this case, in order to fire cylinder #3 or #2 at the target ignition timing $\theta_A(n-1)$, the control time Ta$_1$(n−1) or Ta$_2$(n−1) are respectively calculated as follows:

$$Ta_1(n-1) = (\theta_j - \theta_A) \times TF(n-1)/180°$$
$$= (B75° + \delta\theta_j - \theta_A) \times TF(n-1)/180°$$
$$Ta_2(n-1) = (\theta_k - \theta_A) \times TF(n-1)/180°$$
$$= [B75° - \theta_A - \{70° + (\delta\theta_j - \delta\theta_k)\}] \times TF(n-1)/180°$$

Using the estimated period $TF(n-1)$ for the crank angle of 180°, the angular distances or crank angles between the reference positions $\theta_j$ or $\theta_k$ up to the target ignition timing $\theta_A(n-1)$ are converted into corresponding times, respectively.

In order to fire cylinder #4 or #1 at the target ignition timing $\theta_A(n)$, the control time $Ta_1(n)$ or $Ta_2(n)$ are calculated as follows:

$$Ta_1(n) = (\theta_m - \theta_A) \times TF(n)/180°$$
$$= (B75° + \delta\theta_m - \theta_A) \times TF(n)/180°$$
$$Ta_2(n) = (\theta_0 - \theta_A) \times TF(n)/180°$$
$$= [B75° - \theta_A - (70° + \delta\theta_m)] \times TF(n)/180°$$

That is, the angular distances from the reference position $\theta_m$ and $\theta_0$ up to the target ignition timing $\theta_A(n)$ are respectively converted into corresponding times by use of the estimated period $TF(n)$ for 180°.

In this manner, control times $Ta_1(n-1)$ or $Ta_2(n-1)$ and $Ta_1(n)$ or $Ta_2(n)$ up to the target ignition timings $\theta_A(n-1)$ and $\theta_A(n)$ can be calculated for each cylinder. In this regard, the deviations or errors $\delta\theta_j$, $\delta\theta_k$ and $\delta\theta_m$ involved in the above formulae can be in advance calculated on the basis of the number of teeth of the ring gear.

Although in the above embodiment, the modified reference positions $\theta_0$, $\theta_j$, $\theta_k$ and $\theta_m$ of the modified reference position signal ST' correspond to an rising edge or a falling edge of each pulse of the reference position signal ST, the preset resetting values input to the preset input terminal PS of the counter 8 can be arbitrarily set so as to determine the first and second reference positions corresponding to desired crank angles.

Figure 5:
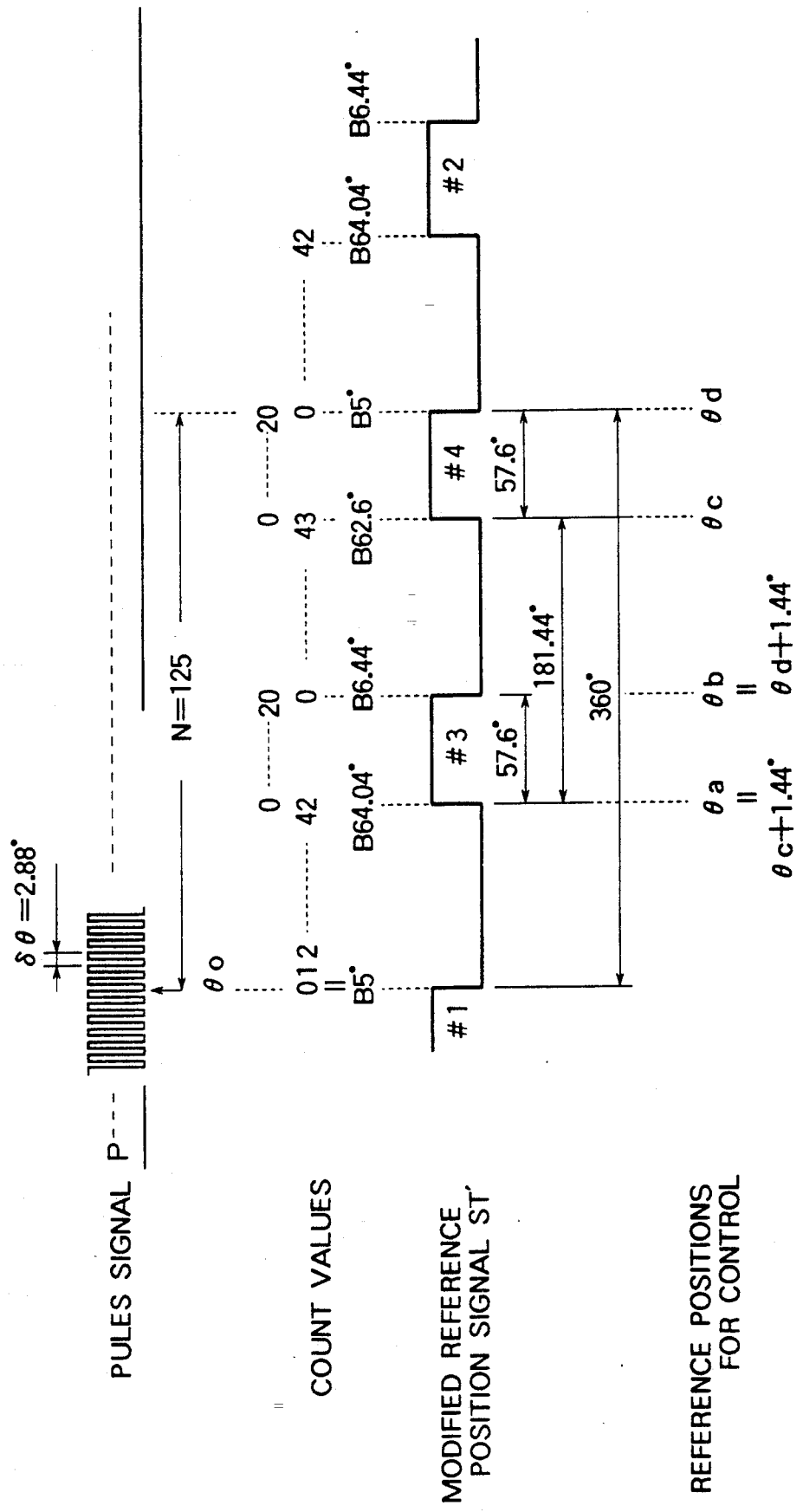
FIG. 5 is a waveform diagram showing another example of a deviation correction or modifying operation according to the invention.

FIG. 5 illustrates the waveforms of a pulse signal P and a modified reference position signal ST' for an example of a ring gear having an odd-numbered teeth in which the number N of the teeth is 125. In this embodiment, a pitch or interval $\delta\theta$ of the pulse signal P is 2.88°. Let us assume that the resetting values of the counter 8 for cylinders #1, #3, #4 and #2 be 42, 20, 43 and 20, respectively. In this case, the first reference positions $\theta_0$ (or $\theta_d$) and $\theta_b$ are B5° and B6.44°, respectively, and the second reference positions $\theta_a$ and $\theta_c$ are B64.04° and B62.6°, respectively.

Accordingly, if $\theta_c$ (i.e., B62.6°) is supposed to be a reference crank angle with no deviation or error, $\theta_a$ is equal to $\theta_c$ plus 1.44°. Similarly, $\theta_b$ is equal to $\theta_d$ (i.e., B5°) plus 1.44°. Here, 1.44° corresponds to an error or deviation involved in the modified reference position.

Figure 6:
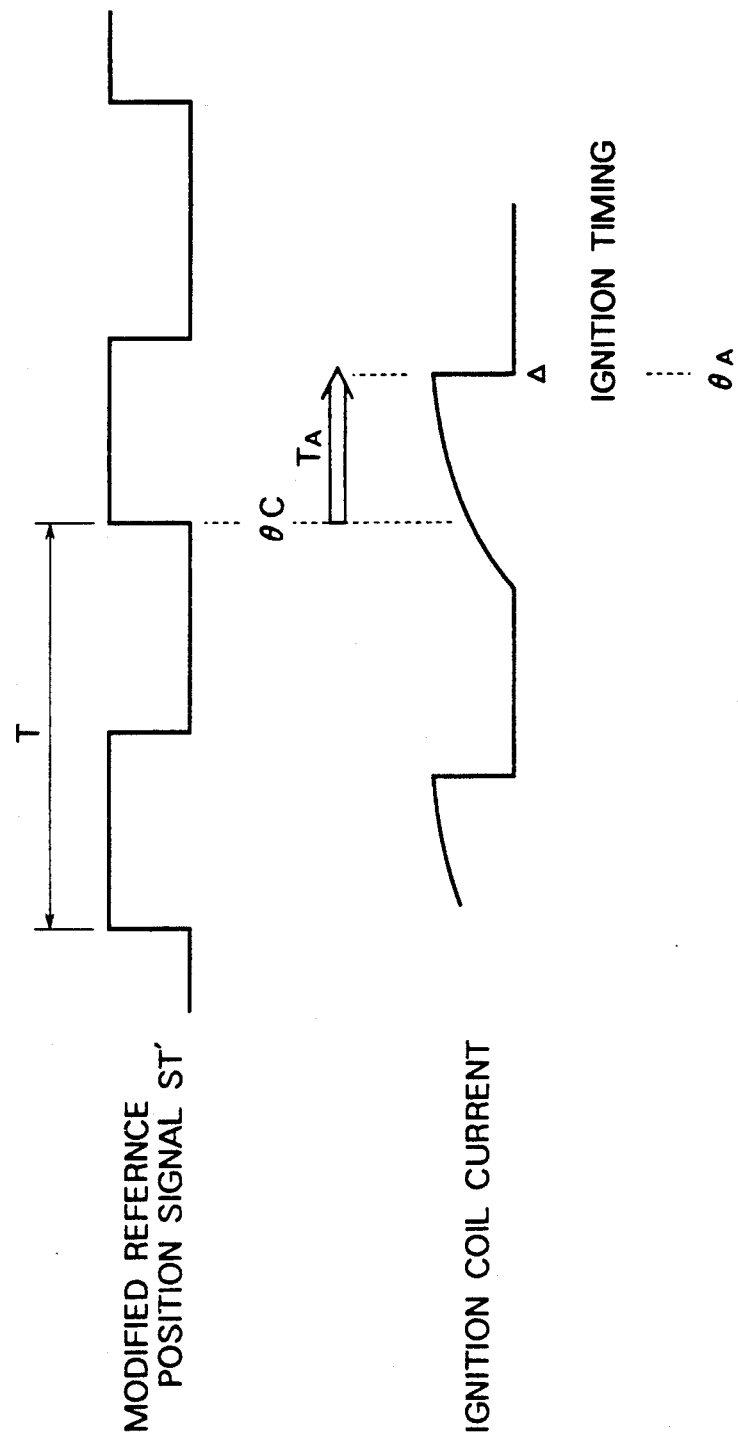
FIG. 6 is a waveform diagram explaining an ignition period of a modified reference position signal and an ignition timing at which the power supply to an ignition coil is cut off.

Subsequently, a control time $T_A$ for a target ignition timing $\theta_A$ can be calculated on the basis of a previous ignition period T, as shown in FIG. 6, instead of using an estimated ignition period as in the previous embodiment. Specifically, for cylinders #1 and #4, a previous ignition period from $\theta_a$ to $\theta_c$ is equal to an angular distance or crank angle of 181.44°, so a control time $T_A$ for the target ignition timing $\theta_A$ is calculated as follows:

$$T_A = [(\theta_c - \theta_A)/180°] \times [(180°/181.44°)T]$$
$$= (\theta_c - \theta_A)T/181.44°$$

For cylinders #2 and #3, a previous ignition period from $\theta_c$ to $\theta_a$ is equal to an angular distance or crank angle of 178.56°, and $\theta_a = \theta_c + 1.44°$. Thus, a control time $T_A$ for the target ignition timing $\theta_A$s is calculated as follows:

$$T_1 = [\{(\theta_c + 1.44°) - \theta_A\}/180°] \times [(180°/178.56°)T]$$
$$= [(\theta_c + 1.44°) - \theta_A])T/178.56°$$

In this manner, a control time $T_A$ for a desired target ignition timing $\theta_A$ can be calculated irrespective of the teeth number of the ring gear and the reference positions $\theta_a$ through $\theta_d$.

Moreover, as can be seen from FIG. 2, the initial reference position $\theta_0$ contains an error $\delta\theta_0$ with respect to the true or ideal reference position, which error is less than the pulse pitch or interval $\delta\theta$ (e.g., 3° in the illustrated embodiment) between successive pulses in the pulse signal P. Thus, the memory means of the microcomputer 5A stores the error $\delta\theta_0$, and the modifying means of the microcomputer 5A controls the engine operation in a modified manner so as to reflect the error $\delta\theta_0$.

Further, in the stable operating range of the engine, the microcomputer 5A again detects a new initial reference position $\delta\theta_0'$, and the updating means of the microcomputer 5A compares it with the old or previously set initial reference position $\theta_0$ stored in the memory means, and updates or replaces the old initial reference position $\theta_0$ with the new one $\theta_0'$ if a difference therebetween exceeds the predetermined value.

Now, the above-mentioned updating or modifying operation of the microcomputer 5A will be described below in detail while referring to the waveform diagrams of FIGS. 7 and 8.

Figure 7:
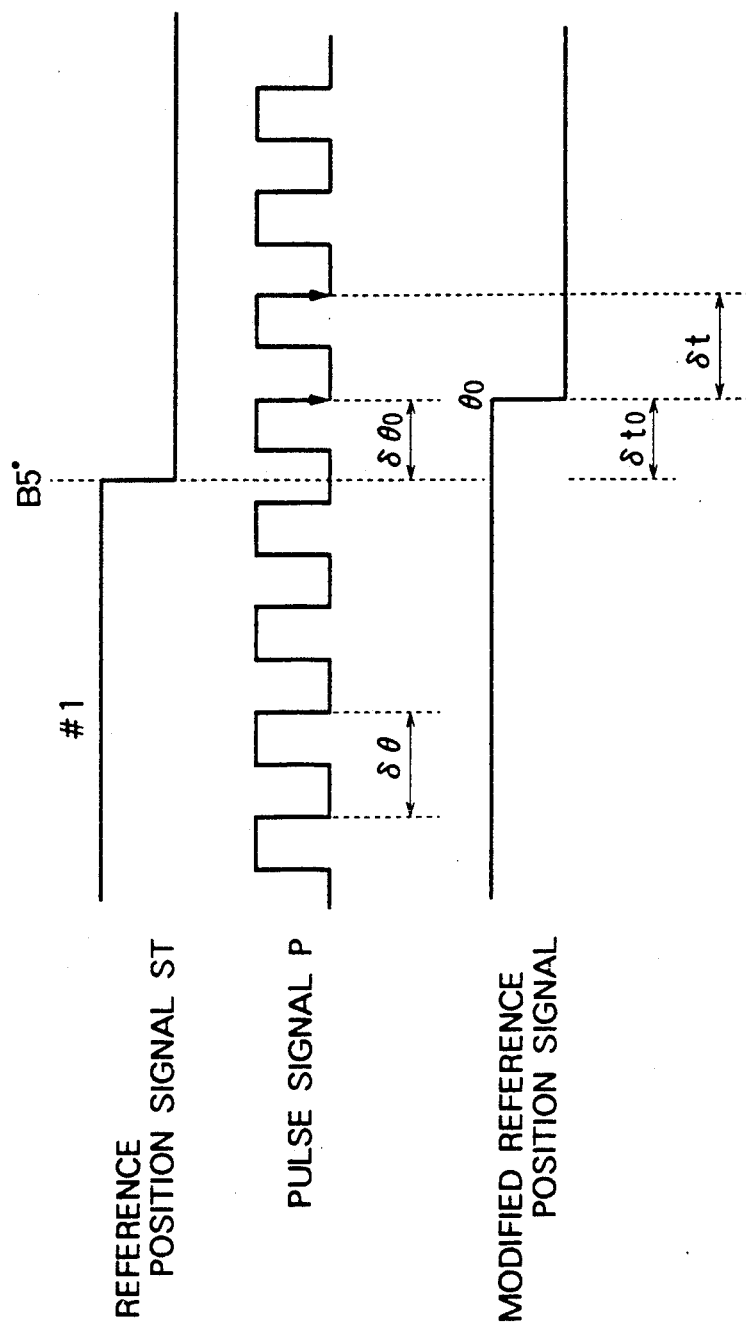
FIG. 7 is a waveform diagram, on an enlarged scale, explaining a difference or deviation of a reference position of the reference position signal ST from a modified reference position of the modified reference position signal ST'.

FIG. 7 shows an error $\delta\theta_0$ between the modified reference position $\theta_0$ and the first reference position B5° of cylinder #1, wherein $\delta_t$ is a pitch time corresponding to the pitch $\delta\theta$ of the pulse signal P; and $\delta t_0$ is an error time corresponding to the error $\delta\theta_0$. The pitch time $\delta_t$ can be calculated from the number of teeth of the ring gear, as in the case of the pitch $\delta\theta$.

Figure 8:
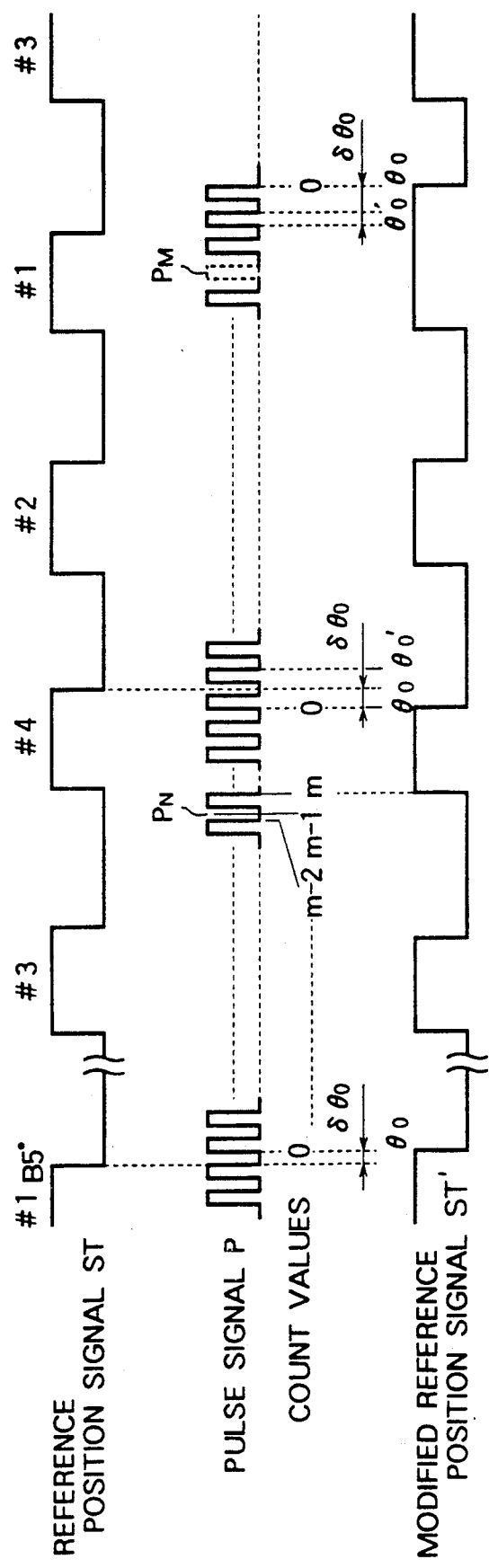
FIG. 8 is a waveform diagram explaining modified reference positions and newly modified reference positions of the modified reference position signal ST'.

FIG. 8 shows a difference between the first set or old initial reference position $\theta_0$ and a new initial reference position $\theta_0'$ when noise $P_N$ is superposed on the pulse signal P or when a miss $P_M$ in the detection of the pulse signal P takes place. In the case of the superposition of noise $P_N$, the new initial reference position $\theta_0'$ is advanced from a normal one, whereas in the case of the miss in the signal detection, the new initial reference position $\theta_0'$ is retarded from a normal one.

In general, the teeth position of the ring gear is not exactly adjusted, so the initial reference position $\theta_0$ as initially set contains an error in the form of a delay angle $\delta\theta_0$ less than the pulse pitch $\delta\theta$ with respect to the true or ideal reference position B5°. Thus, in order to avoid adverse effects of the error on the engine control, it is necessary to modify the initial reference position $\theta_0$ so as to make it exactly correspond to the absolute or true reference position.

To this end, the microcomputer 5A measures an error or deviation time $\delta t_0$ from the time of detection of the first reference position B5° up to the falling of the pulse signal P, converts it into a corresponding crank angle using the pitch time $\delta_t$, and calculates the error $\delta\theta_0$ as follows:

$$\delta\theta_0 = \delta\theta(\delta t_0/\delta t)$$

The error $\delta\theta_0$ thus obtained is stored in the memory means of the microcomputer 5A and it is used for making the initial reference position $\theta_0$ exactly match the absolute crank angle or position and thus reflected on the subsequent engine control.

Thereafter, each time the engine enters the stable operating range (e.g., idling operation), a new initial reference position $\theta_0'$ is determined. In this case, however, as illustrated in FIG. 8, the initial reference position $\theta_0$ previously stored can shift or deviate from the absolute reference position due to the superposition of noise $P_N$ on the pulse signal P, or due to a miss in the signal detection or the like.

In order to avoid this, the updating means of the microcomputer 5A compares the newly set initial reference position $\theta_0'$ with the old or previously stored initial reference position $\theta_0$, and updates the old one $\theta_0$ with the new one $\theta_0'$ if a difference therebetween exceeds a predetermined value.

Figure 9:
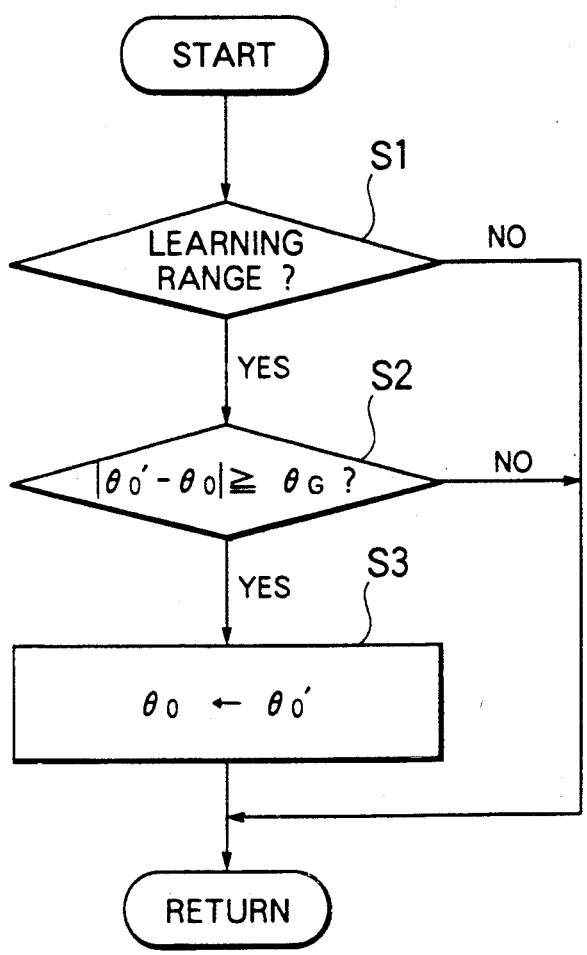
FIG. 9 is a flow chart showing the operation of the invention.

Such an updating operation will be described below with reference to the flow chart of FIG. 9.

First, in Step S1, it is determined whether the current engine operating range is in a learning or stable operating range (e.g., an idling operation). If the answer to this question is positive, then in Step S2, a new initial reference position $\theta_0'$ is calculated and compared with the previously stored initial reference position $\theta_0$ to determine whether the absolute value of a difference $|\theta_0' - \theta_0|$ therebetween is greater than a predetermined value $\theta_G$. For example, the predetermined value $\theta_G$ is set to a value corresponding to one pitch $\delta\theta$ of the pulse signal P.

If the answer in Step S2 is positive (i.e., $|\theta_0' - \theta_0| > \theta_G$), then in Step S3, the old initial reference position $\theta_0$ previously stored is updated with the new initial reference position $\theta_0'$.

As a result, even if the initial reference position $\theta_0$ is shifted or deviated from the first reference position B5° due to noise $P_N$ or due to a missing $P_N$ of a pulse in the pulse signal P, the initial reference position $\theta_0$ is automatically updated to the new exact or correct initial reference position $\theta_0'$.

In this connection, the step S2 for determining the amount of shift of the initial reference position $\theta_0$ can be performed on the basis of the error $\delta\theta_0$, as depicted in FIG. 8. For example, if the error $\delta\theta_0$ in the initial reference position $\theta_0$, which should be later than the first reference position B5° (i.e., in the retarding side of the first reference position B5°), it is determined that noise $P_N$ is superposed on the pulse signal P. On the other hand, if the absolute value of a difference ($|\delta\theta_0' - \delta\theta_0|$) between a new error $\delta\theta_0'$ and an initial error $\delta\theta_0$ is greater than one pitch $\delta\theta$ of the pulse signal P, it is determined that there is a missing $P_N$ in the detected signal P. Accordingly, the updating means of the microcomputer 5A updates the initial reference position $\theta_0$ and the error $\delta\theta_0$ to the new values $\theta_0'$ and $\delta\theta_0'$, respectively, which are then stored in the memory means.

Figure 10:
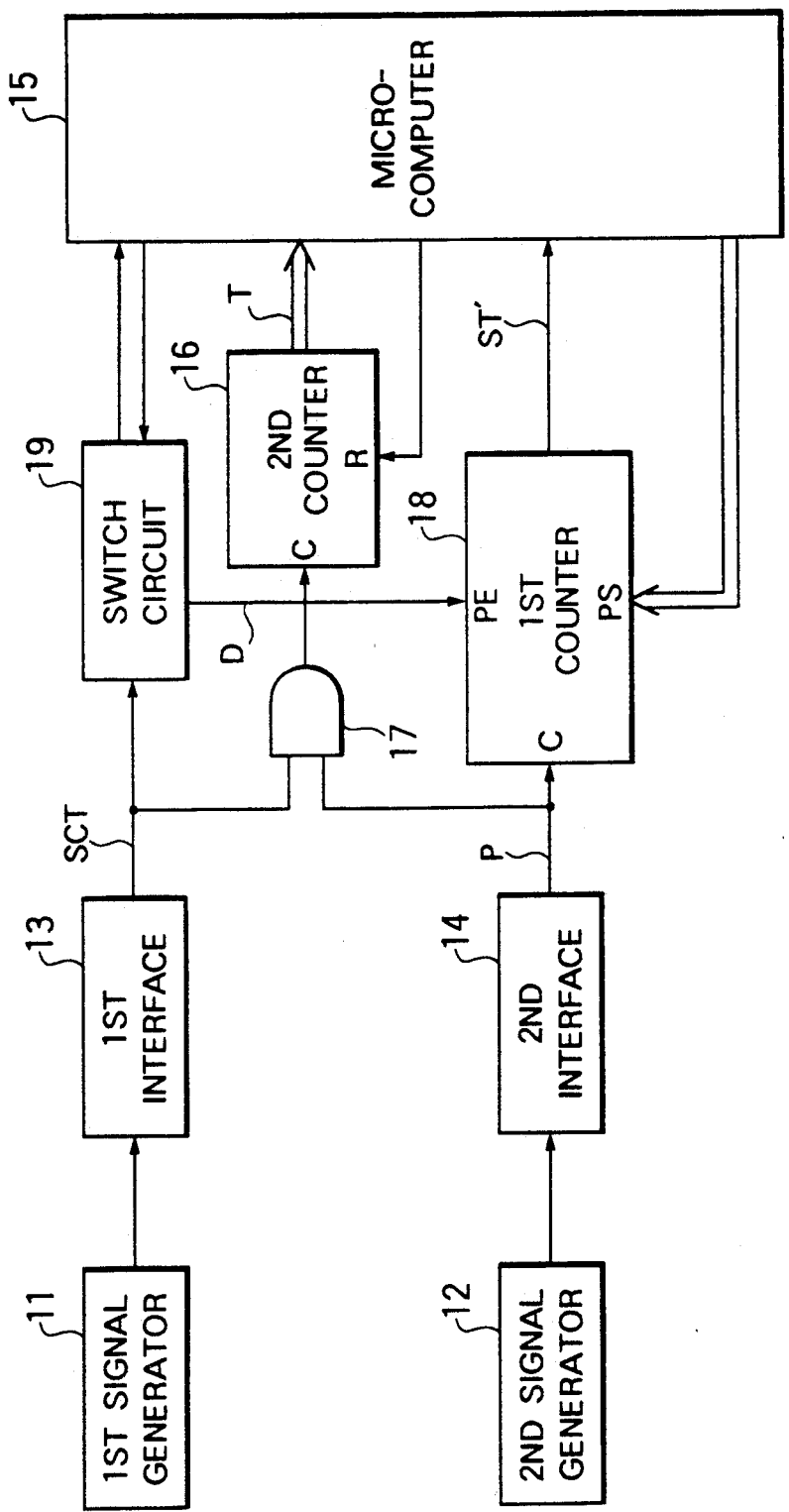
FIG. 10 is a block diagram showing the general arrangement of an engine control apparatus according to a further embodiment of the invention.

FIG. 10 shows a further embodiment of the invention. In this embodiment, a first signal generator 11 mounted on a camshaft generates a signal SCT containing a series of pulses having different pulse widths each for a corresponding cylinder, each pulse being indicative of a reference crank position (e.g., B5°) for each cylinder. A second signal generator 12, which is similar to the pulse signal generator 6 of FIG. 1, generates a pulse signal P comprising a series of pulses having a predetermined pitch or interval (e.g., a crank angle of 3°).

The output signal SCT from the first signal generator 11 is supplied via a first interface 13 to a switch circuit 19, which is similar to the switch circuit 9 of FIG. 1, and to a first input terminal of an AND gate 17. The output signal P of the second signal generator 12 is supplied via a second interface 14 to a clock terminal C of a first counter 18 in the form of a reference position pulse counter, which is similar to the counter 8 of FIG. 1, and to a second input terminal of the AND gate 17.

The switch circuit 19 has a first output connected to a control unit in the form of a microcomputer 15 and to an enable input terminal PE of the first counter 18 which has a preset input terminal PS connected to the microcomputer 15, and an output terminal connected to the microcomputer 15. The switch circuit 19 is switched over by the microcomputer 15 to selectively supply an output signal in the form of the SCT signal to the microcomputer 15 and to the enable input terminal PE of the first counter 18. In the unstable operating range (e.g., the start-up period) of the engine, the switch circuit 19 supplies the output signal SCT from the first signal generator 11 to the microcomputer 15, whereas in the stable operating range (i.e., the idling operation), it supplies, in response to the output signal SCT from the first signal generator 11, a reference position detection signal D representative of the first reference position B5° of each cylinder to the enable input terminal PE of the first or reference position pulse counter 18. The switch circuit 19 may be incorporated in the microcomputer 15.

The first counter 18 starts counting the pulse signal P from the second signal generator 12 upon receipt of a reference position detection signal D from the switch circuit 19 at the enable input terminal PE, and generates an output signal ST' which is alternately inverted each time the counted value of the counter 18 reaches a preset value supplied to the preset input terminal PS from the microcomputer 15. In this regard, the modified reference position signal ST' is based on the number of pulses in the pulse signal P counted from an initial reference position $\theta_0$ which is initially set upon the first fall of the pulse signal P after detection of the first reference position B5° of any cylinder (e.g., cylinder #1) in the stable operating range.

A second counter 16 in the form of a cylinder identifying pulse counter is provided which has a clock terminal C connected to an output terminal of the AND gate 17, a reset terminal R connected to the microcomputer 15 so as to be reset by a reset signal from the latter, and an output terminal connected to the microcomputer 15 for supplying an output signal T thereto. The second counter 16 counts the output signal from the AND gate 17 until it is reset by a reset signal input from the microcomputer 15 to the reset terminal R of the second counter 16. That is, as clearly depicted in FIG. 11, the second counter 16 counts the number of pulses in the pulse signal P from the second signal generator 12 during the width of each pulse in the output signal SCT from the first signal generator 11, and generates an output signal T indicative of the counted number of pulses in the pulse signal P. In the illustrated example, the widths $T_1$ through $T_4$ of four cylinder identifying pulses (e.g., for four cylinders #1, #3, #4 and #2) in the SCT signal are set such that they correspond to 18, 23, 28 and 33 pulses, respectively. In general, the pulse widths $T_1$ through $T_4$ can be arbitrarily set to such values as to allow cylinder identification as well as to provide sufficient ignition energy for forced ignition control in the unstable operating range of the engine even if the cylinder identifying count signal T or the counted value of the second counter 16 involves an error in the range of about ±1 which might be caused due to noise contained in the pulse signal P or due to the inaccuracy in size or location of slits in a rotating disk of the first signal generator 11. The AND gate 17 and the second counter 16 together constitute a cylinder identifying means of the invention.

In this embodiment, the microcomputer 15 functions to supply a predetermined resetting count value to the preset terminal PS of the first counter 18, and switch over the switch circuit 19 in accordance with the operating range of the engine whereby it controls the ignition timing of each cylinder based on the output signal SCT from the first signal generator 11 and the cylinder identifying signal T in the form of the counted value of the second counter 16 in the unstable operating range of the engine, but based on the cylinder identifying signal T and the modified reference position signal ST' from the first counter 18 in the stable operating range of the engine.

Figure 11:
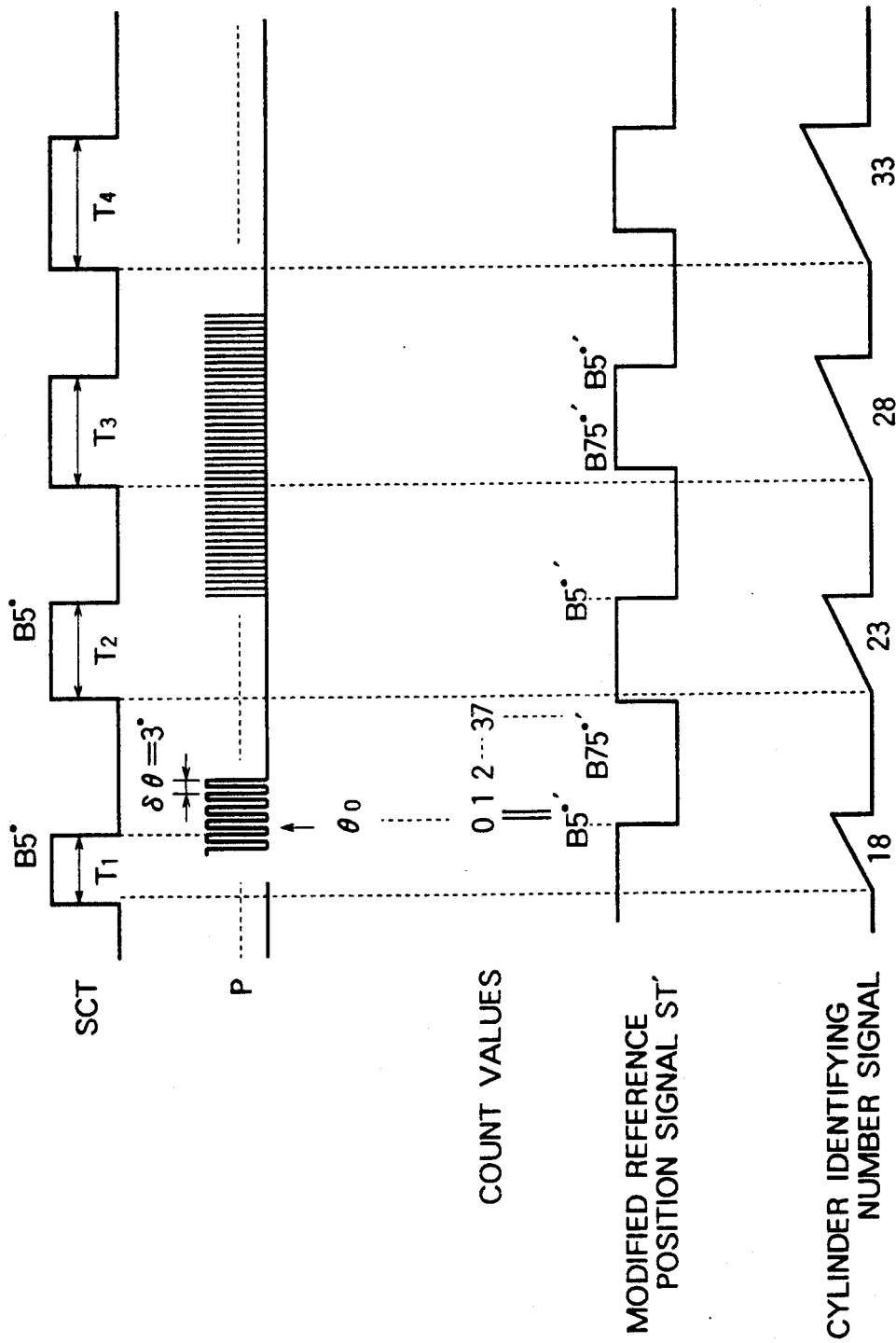
FIG. 11 is a waveform diagram showing the waveforms of various signals used in the embodiment of FIG. 10.

FIG. 11 shows the waveforms of various signals used in this embodiment in which the specifications for the various elements are as follows: the number of teeth of the ring gear is 120; the pitch $\delta\theta$ of the pulse signal P is 3°; the number of pulses counted from the modified second reference position B5°' to the modified third reference position B75°' of the modified reference position signal ST' (i.e., corresponding to an angular distance or crank angle of 110°) is 37; and the number of pulses counted from the modified third reference position B75°' to the modified second reference position B5°' (i.e., corresponding to an angular distance or crank angle of 70°) is 23.

Now, the operation of this embodiment will be described while referring to FIG. 2. First, in the unstable engine operating range, such as the start-up period, the rotational speed of the engine fluctuates greatly, so it is difficult for the second signal generator 12 to generate a pulse signal P exactly corresponding to the rotational position or crank angle of the crankshaft. Thus, in this state, the microcomputer 15 supplies no resetting signal to the preset input terminal PS of the first counter 18, thereby holding the first counter 18 inoperative. It also controls the switch circuit 19 such that the output signal SCT from the first signal generator 11 is fed to the microcomputer 15 through the first interface 13 and the switch circuit 19. At this time, the second counter 16 counts the number of pulses in the pulse signal P from the second signal generator 12 which have passed the AND gate 17. That is, it counts the number of pulses in the pulse signal P generated during the pulse width $T_1$, $T_2$, $T_3$ or $T_4$ of each pulse in the SCT signal and generates a corresponding output signal in the form of a cylinder identifying number signal T to the microcomputer 15. Thus, the microcomputer 15 performs engine control such as ignition control, fuel injection control, etc., based on the output signal SCT from the first signal generator 11 and the cylinder identifying number signal T from the second counter 16.

Subsequently, when the engine enters idling operation in which the engine rotation is stable without any substantial fluctuations or variations, the first signal generator 11 generates a stable pulse signal P, so the microcomputer 15 sets the initial reference position $\theta_0$. That is, when the microcomputer 15 determines that the engine is in the stable operating range, it switches over the switch circuit 19 such that the output signal SCT input to the switch circuit 19 via the first interface 13 can be output to the enable input terminal PE of the first counter 18. Simultaneous with this, the microcomputer 15 supplies a resetting count value "1" to the preset input terminal PS of the first counter 18 to preset the count value thereof to "1". In this state, the first counter 18 waits for an input of a reference position detecting signal D from the switch circuit 19 at the enable input terminal PE.

Upon detection of the first reference position B5° of any cylinder after the switch over of the switch circuit 19, the switch circuit 19 generates a reference position detecting signal D which is fed to the enable input terminal PE of the first counter 18. As a result, the counter 18 starts counting the pulse signal P supplied to its clock input terminal C via the second interface 14. Since the counter 18 is preset to "1" to hold its output signal at a high level, as referred to above, the output signal of the counter 18 in the form of a modified reference position signal ST' falls into a low level upon the first fall of the pulse signal P (i.e., at the initial modified reference position $\theta_0$). At this time, the microcomputer 15 identifies the first reference position B5° of cylinder #1 based on the cylinder identifying number signal T which has already been input thereto and which indicates a counted number of the pulse signal P for the cylinder, for example, "18" for cylinder #1.

Simultaneous with the cylinder identification (i.e., at the first reference position B5° of the identified cylinder), the microcomputer 15 resets the first counter 18 and supplies a new resetting count number (e.g., "37"), which corresponds to the second reference position B75° of the following cylinder #3, to the preset input terminal PS of the first counter 18. Upon receipt of the new resetting count number, the counter 18 again starts counting and makes its output signal ST' rise at the instant when the counted value of the counter 18 reaches "37", thus defining the modified second reference position B75°' for the following cylinder #3.

At the same time, the microcomputer 15 resets the first counter 18 and supplies a new resetting count number "23", which corresponds to the modified first reference position B5°' of the following cylinder #3, to the preset input terminal PS of the first counter 18 whereupon the counter 18 again starts counting. When the counted value of the counter 18 starting from the modified second reference position B75°' of the following cylinder #3 reaches "23", the output signal ST' of the counter 18 falls, defining the modified first reference position B5° of the following cylinder #3.

Subsequently, the above operations are repeated substantially in the same manner so that it continuously generates the modified reference position signal ST' which is alternately inverted each time the modified first or second reference position B5°' or B75°' is reached. This continues after the engine enters the normal operating range.

The modified reference position signal ST' thus obtained is measured from the exact initial reference position $\theta_0$ and hence is completely synchronized with the rotation of the crankshaft. Therefore, there is no error or deviation involved in the detection of the first and second reference position B5° and B75° of each cylinder if external disturbances such as noise are ignored.

Since each fall of the pulse signal P after the initial reference position $\theta_0$ corresponds to a multiple of 3°, the predetermined count values "37" and "23" are stored in the memory means of the microcomputer 15 and output therefrom to the preset input terminal PS of the first counter 18 in an alternate manner so that the counter 18 generates based thereon an output signal ST' indicative of the modified first and second reference positions B5°' and B75°' for each cylinder. On the basis of these modified exact reference positions, the microcomputer 15 performs engine control such as ignition control, fuel injection control and the like in a most accurate manner.

Figure 12:
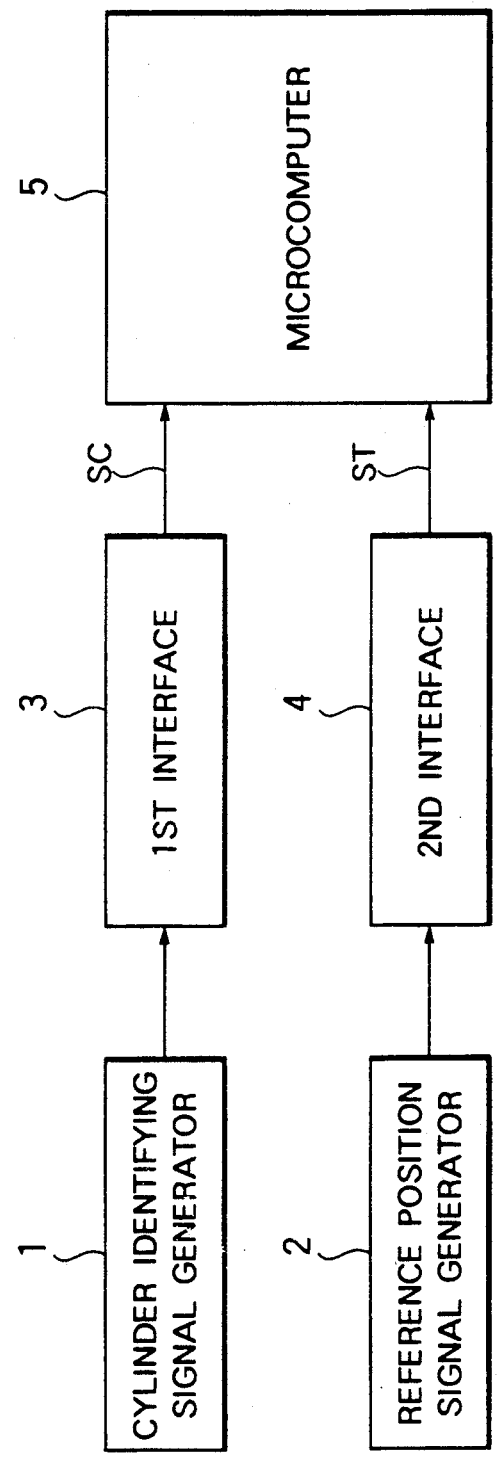
FIG. 12 is a block diagram showing the general arrangement of a conventional engine control apparatus.

In the above embodiments, since the waveform of the modified reference position signal ST' input to the microcomputer 5A or 15 is substantially similar to that of the reference position signal ST as used in the conventional apparatus of FIG. 12, it is not necessary to change or modify various calculating processing executed by the microcomputer 5A or 15 and hence it is possible to use the conventional software as used in the microcomputer 5 of the conventional apparatus of FIG. 12, thus requiring no additional costs therefor.

In the above embodiments, the counter 8 or 18 is initially preset to "1" for the initial setting of an initial reference position $\theta_0$, but, for the same purpose, a hardware means can be provided for sensing the first fall of the pulse signal P after generation of a reference position detecting signal D.

Although in the above embodiments, the engine having four cylinders has been described, the present invention is equally applicable to an engine having a desired number of cylinders such as a six-cylinder or eight-cylinder engine.

Further, in the above embodiments, the first and second reference positions for each cylinder are described as B5° and B75°, respectively, but they can be set to any desired crank angles as necessary.

Furthermore, although the pulse signal generator 6 comprises a ring gear, other type of signal generators can be used for the same purpose.

What is claimed is:

1. A control apparatus for controlling a multi-cylinder internal combustion engine having a crankshaft and a camshaft which is operatively connected with the crankshaft for synchronized rotation therewith, said control apparatus comprising:

first signal generating means (1,2; 11) provided on said camshaft for generating a signal which contains cylinder identifying information and a first reference position for each cylinder;

second signal generating means (6; 12) provided on said crankshaft for generating a pulse signal comprising a series of pulses, said pulse signal having a predetermined pitch between successive pulses which corresponds to a predetermined crank angle;

a counter (8; 18) connected to receive the pulse signal from said second signal generating means for counting pulses in the pulse signal starting from the first reference position of the output signal from said first signal generating means to thereby generate a modified output signal;

a control unit (5A; 15) for controlling the engine based on the output signals from said first and second signal generating means and said counter; and a switch (9; 19) connected to receive the output signal from said first signal generating means for selectively outputting the output signal from said first signal generating means to said counter and said control unit, said switch being switched over by said control unit such that it disables said counter and supplies the output signal from said first signal generating means to said control unit in an unstable operating range of the engine, whereas it enables said counter to modify said output signal from said first signal generating means and supply it to said control unit in a stable operating range of the engine.

2. A control apparatus for controlling a multi-cylinder internal combustion engine having a crankshaft and a camshaft which is operatively connected with the crankshaft for synchronized rotation therewith, said control apparatus comprising:

a first signal generator provided on said camshaft for generating a cylinder identifying signal;

a second signal generator provided on said camshaft for generating a reference position signal indicative of a first reference position and a second reference position for each cylinder, said first and second reference positions corresponding to predetermined rotational positions of said crankshaft, respectively;

a third signal generator provide on said crankshaft for generating a pulse signal comprising a series of pulses in synchronization with the rotation of said crankshaft, said pulse signal having a predetermined pitch between successive pulses which corresponds to a predetermined crank angle;

a counter connected to receive the pulse signal from said third signal generator for counting pulses in the pulse signal starting from an initial reference position and generating a modified reference position signal indicative of a modified first reference position and a modified second reference position;

a control unit for controlling the engine based on the output signals from said signal generators and said counter;

a switch connected to receive the output signals from said first and second signal generators for selectively outputting the output signal from said second signal generator to said counter and said control unit, said switch being switched over by said control unit such that it disables the counter and supplies the reference position signal from said second signal generator to said control unit in an unstable operating range of the engine, whereas it enables the counter to supply the modified reference position signal to said control unit in a stable operating range of the engine.

3. A control apparatus according to claim 2, wherein said control unit sets the initial reference position based on the reference position signal from said second signal generator and the pulse signal from said third signal generator in the stable operating range of the engine, modifies the first and second reference positions for each cylinder based on the initial reference position and the pulse signal from said third signal generator to provide the modified first reference position and the modified second reference position for each cylinder, and controls the engine based on the modified first and second reference positions for each cylinder.

4. A control apparatus according to claim 3 wherein said control unit alternately presets said counter to a first predetermined resetting value for the modified first reference position and to a second predetermined resetting value for the modified second reference position.

5. A control apparatus according to claim 2, wherein said control unit includes means for reflecting deviations of the modified first and second reference positions of the modified reference position signal from corresponding true first and second reference positions of said crankshaft on the engine control.

6. A control apparatus according to claim 2, wherein said control unit sets a new initial reference position from which said counter starts counting, and said control means further includes memory for storing the initial reference position previously set by said control unit, and updating means for updating the previously set initial reference position stored in the memory means to the new initial reference position if a difference therebetween is greater than a predetermined value.

7. A control apparatus for controlling a multi-cylinder internal combustion engine having a crankshaft and a camshaft which is operatively connected with the crankshaft for synchronized rotation therewith, said control apparatus comprising:
a first signal generator provided on said camshaft for generating a signal which contains cylinder identifying information and a first reference position for each cylinder;
a second signal generator provided on said crankshaft for generating a pulse signal comprising a series of pulses, said pulse signal having a predetermined pitch between successive pulses which corresponds to a predetermined crank angle;
a first counter connected to receive the pulse signal from said second signal generator for counting the pulse signal starting from a modified reference position corresponding to the first reference position and generating a modified reference position signal;
cylinder identifying means connected to receive the output signals from said first and second signal generators for reading out the cylinder identifying information contained in the output signal from said first signal generator and generating a corresponding signal;
a control unit for controlling the engine based on the output signals from said signal generators, said cylinder identifying means and said counter; and
a switch connected to receive the output signal from said first signal generator for selectively outputting it to said counter and said control unit, said switch being switched over by said control unit such that it disables the counter and supplies the output signal from said first signal generator to said control unit in an unstable operating range of the engine, whereas it enables the counter to supply the modified reference position signal to said control unit in a stable operating range of the engine.

8. A control apparatus according to claim 7, wherein the control unit sets an initial reference position based on the output signal from said cylinder identifying means in a stable operating range of the engine, determines a modified first reference position and a modified second reference position for each cylinder based on the initial reference position and the output signal from said first counter, and controls the engine based on the modified first and second reference positions for each cylinder.

9. A control apparatus according to claim 8, wherein said control unit alternately presets said counter to a first predetermined resetting value for the modified first reference position and to a second predetermined resetting value for the modified second reference position.

10. A control apparatus according to claim 7, wherein said first signal generator generates a pulse signal containing a plurality of pulse which correspond in number to the cylinders and which have different pulse widths.

11. A control apparatus according to claim 10, wherein said cylinder identifying means comprises: an AND gate having a first input terminal connected to said first signal generator, a second input terminal connected to said second signal generator, and an output terminal for generating an output signal when the input terminals are at high levels; and a second counter having a clock terminal connected to the output terminal of said AND gate for counting the output signal from said AND gate and generating a corresponding signal to said control unit.

* * * * *